May 27, 1952 — J. H. JOHNSON — 2,598,390
REMOTE-CONTROL FOR TRACTORS
Filed June 9, 1947 — 3 Sheets-Sheet 1

INVENTOR.
Joseph Henry Johnson.
BY Victor J. Evans & Co.
ATTORNEYS

INVENTOR.
Joseph Henry Johnson.
BY Victor J. Evans & Co.
ATTORNEYS

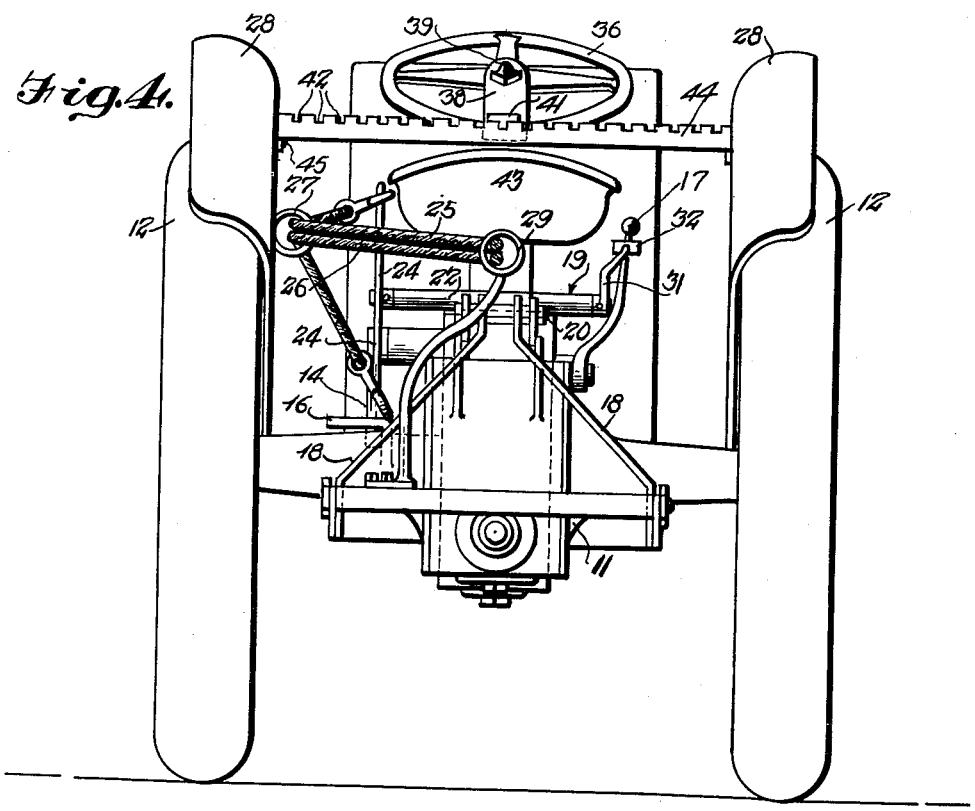

Patented May 27, 1952

2,598,390

UNITED STATES PATENT OFFICE 2,598,390

REMOTE CONTROL FOR TRACTORS

Joseph Henry Johnson, Vermillion, Kans.

Application June 9, 1947, Serial No. 753,592

2 Claims. (Cl. 180—77)

This invention relates to a remote control for tractors.

It is an object of the present invention to provide a remote control arrangement for tractors whereby the tractor may be driven from a wagon, hay rack, manure spreader or any other trail-behind implement from the wagon or implement.

Other objects of the present invention are to provide attachments for a tractor which will readily convert the tractor into a device which can be controlled from the implement which is being pulled by the tractor, which has a minimum number of parts, wherein the power from the lift device on the tractor can be utilized for effecting the operation of the clutch, easy to install, inexpensive to manufacture and efficient in operation.

For other objects and for a better understanding of the invention, reference may be had to the folowing detailed description taken in connection with the accompanying drawing, in which Fig. 1 is a fragmentary elevational view of a tractor having the remote control devices of the present invention.

Fig. 4 is a rear elevational view of the tractor and of the devices.

Fig. 5 is an elevational view, with portions broken away of the attachment which is used for operating the power lift control element.

Figure 1:
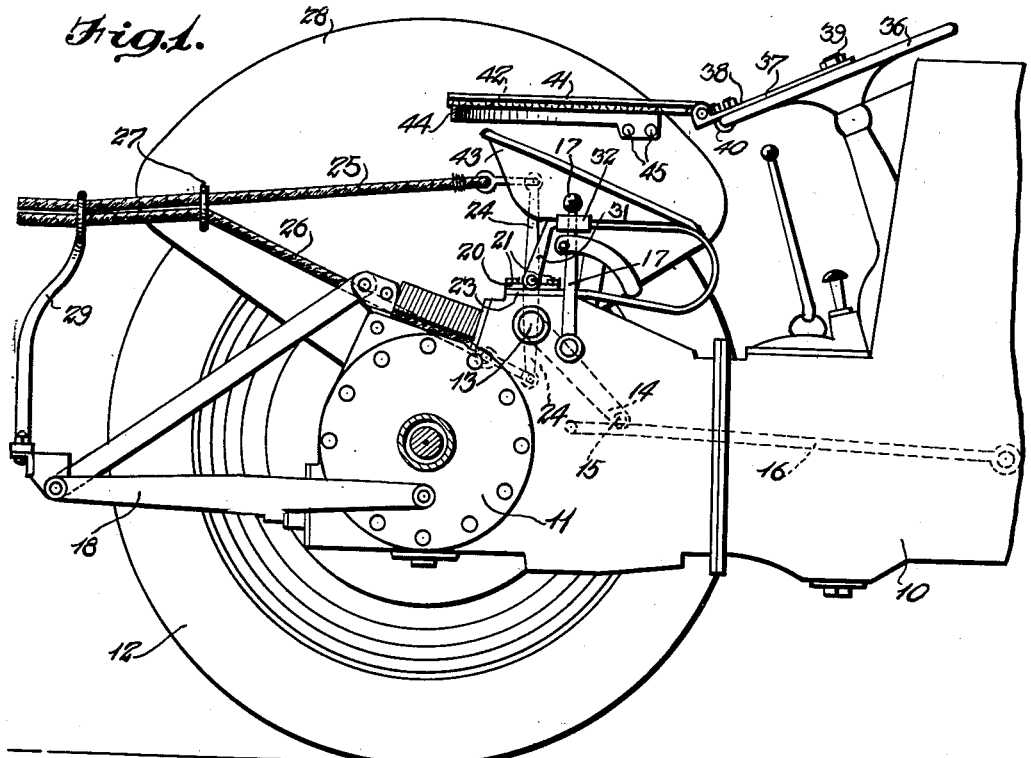
Figure 2:
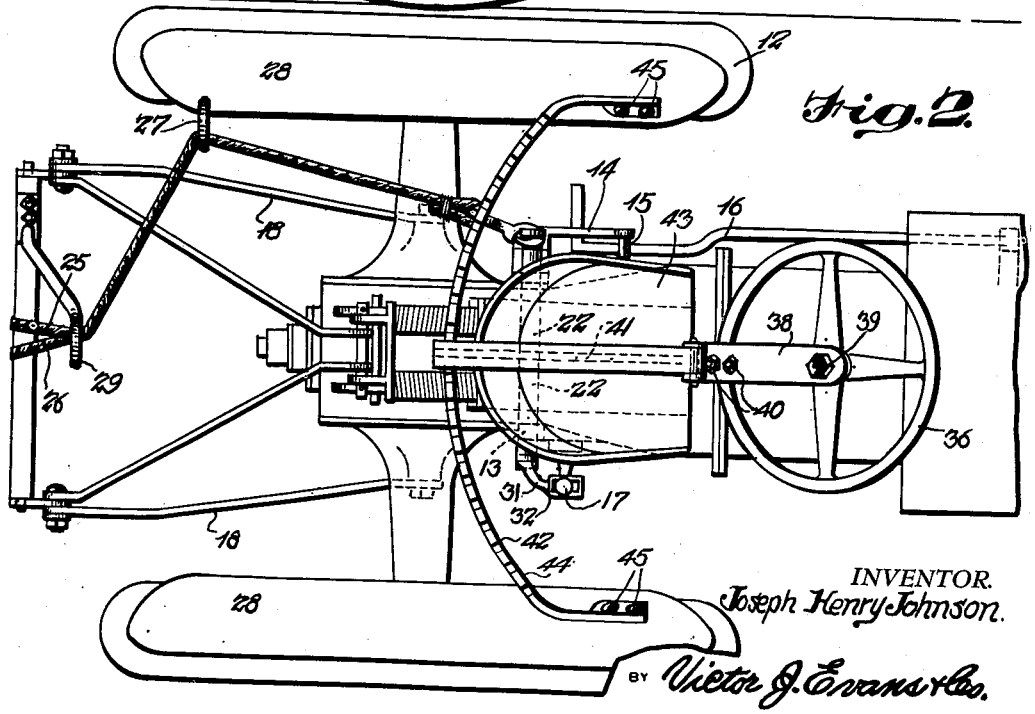
Fig. 2 is a top plan view of the tractor and of the devices attached thereto.
Figure 3:
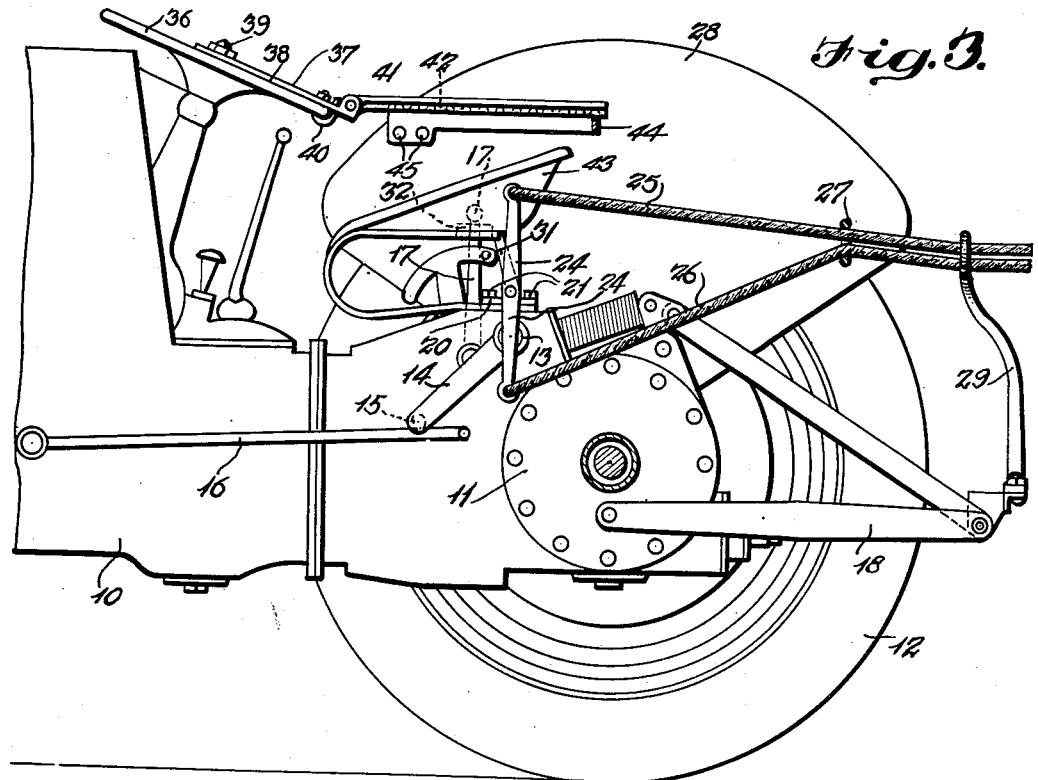
Fig. 3 is a side elevational view of the tractor and of the control devices and looking upon the same from the opposite side of the tractor.
Figure 6:
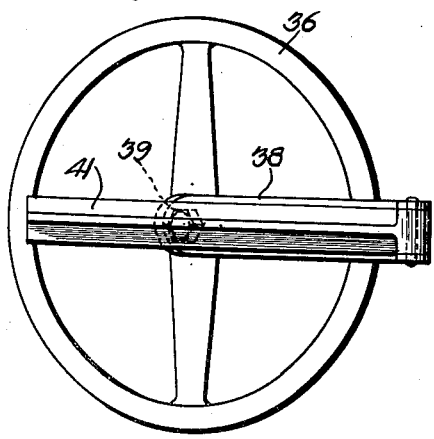
Fig. 6 is a top plan view of the steering wheel of the tractor with the retaining arm folded to its out-of-use position.
Figure 7:
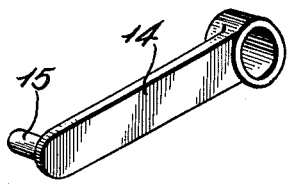
Fig. 7 is a perspective view of the operating arm connected to the power lift and adapted to engage with the clutch operating lever.

Referring now to the figures, 10 represents a tractor body having a rear axle housing structure 11 with traction wheels 12 extending therefrom. Within the tractor body is a power operating device having a shaft 13 extending therefrom to the exterior of the tractor body and to which there is connected an arm 14 having a pin 15 adapted to engage a main clutch operating lever 16. As the operating lever 16 is depressed the main clutch of the tractor will be disengaged.

A control lever 17 extends from the opposite side of the tractor body and normally serves to effect the operation of the lifting linkage 18 which is pivoted upon the rear axle structure and extends to the rear thereof to lift implements directly connected to the tractor. The tractor as shown is of the Ford-Ferguson type.

Adapted to be connected to the top of the tractor body is an attachment 19 comprising a base plate 20 which is secured by bolts 21 to the top of the tractor body and a sleeve 22 welded to the plate 20. The attachment is mounted so that the sleeve extends transversely across the top of the tractor. Extending through the sleeve is a shaft 23 to which there is fixed a double arm 24 from which ropes 25 and 26 extend rearwardly from the opposite ends thereof. The ropes lead rearwardly to the wagon or implement being pulled by the tractor through eye support 27 on one of the mud guards 28 of the tractor and through a vertically extending eye member 29 which is fixed to the links 18 to extend upwardly therefrom to the level of the ropes. The shaft 23 will be rotated in one direction or the other depending upon which rope is pulled.

On the opposite end of the shaft is an arm 31 having a loop 32 which receives the upper end of the power lift control arm 17 to operate the same for the purpose of causing the operation of the power lift device and the rotation of the shaft 13 so as to depress the clutch operating arm 16 or to release the same. Upon operation of the power lift control arm the hydraulic mechanism in the tractor is engaged causing the hydraulic lift shaft 13 to turn and this movement actuates the clutch arm 16 through the arm 14. The control lever 17 will normally effect the operation of valves in the hydraulic system of the tractor for controlling the supply fluid under pressure to the actuating means of the shaft 13 and power lift device as well known.

Extending upwardly from the tractor body is a steering wheel 36 on which there is connected my attachment 37 for securing the wheel while the tractor is being driven by the remote control. My attachment 37 comprises an attaching plate 38 which is secured at one end to the center post of the steering wheel as indicated at 39 and to the ring by a U-clamp 40. To this plate 38, there is hinged an arm 41 which can be lifted and moved rearwardly for engagement with notches 42 of a curved or arcuate shaped member extending between the mud guards 28 in rear of seat 43. This member is indicated generally at 44 and is connected to the mud guards by bolts or rivets 45. When the steering wheel is not to be locked, as when the tractor is being operated from the seat 43, the arm 41 is hinged upwardly and extended forwardly over the top of the steering wheel 36 and upon the attaching plate 38.

While various changes may be made in the detail construction, it shall be understood that

I claim:

1. In an attachment for a tractor, the combination which comprises a tractor housing, a power lift shaft journaled in said housing, a power lift control arm pivotally mounted in said housing and operatively connected to said power lift shaft, a clutch lever also pivotally mounted in the housing and extended along one side thereof an arm on the power lift shaft having a projection on the end thereof positioned to engage the clutch lever of the tractor, a transversely positioned shaft pivotally mounted on the tractor, an arm on one end of the transversely positioned shaft having a loop in the end thereof for receiving the power lift control arm of the tractor, and a double end lever pivotally mounted at a point intermediate of the ends thereof on the said transversely positioned shaft.

2. In an attachment for a tractor, the combination which comprises a tractor housing, a power lift shaft journaled in said housing, a power lift control arm pivotally mounted in said housing and operatively connected to said power lift shaft, a clutch lever also pivotally mounted in the housing and extended along one side thereof an arm on the power lift shaft having a projection on the end thereof positioned to engage the clutch lever of the tractor, a transversely positioned shaft pivotally mounted on the tractor, an arm on one end of the transversely positioned shaft having a loop in the end thereof for receiving the power lift control arm of the tractor, a double end lever pivotally mounted at a point intermediate of the ends thereof on the said transversely positioned shaft, ropes attached to the ends of the double end lever and a guide eye mounted on the end of the tractor through which the ropes pass.

JOSEPH HENRY JOHNSON.

REFERENCES CITED

The following references are of record in the file of this patent:

UNITED STATES PATENTS

| Number | Name | Date |
| --- | --- | --- |
| 1,390,854 | Abbott et al. | Sept. 13, 1921 |
| 1,419,264 | Johnston | June 13, 1922 |
| 1,448,634 | Mettenburg | Mar. 13, 1923 |
| 2,394,210 | Sherman | Feb. 5, 1946 |